Figure 1:
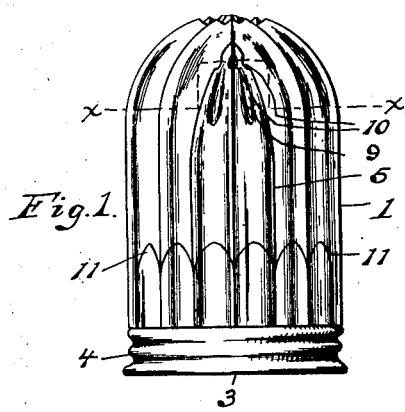

J. W. MEAKER.
CONDIMENT HOLDER.
APPLICATION FILED MAY 22, 1908.

913,029.

Patented Feb. 23, 1909.

WITNESSES:
A. M. Dow.
C. R. Stickney

INVENTOR
John W. Meaker
BY
Barthel & Barthel
ATTORNEYS

UNITED STATES PATENT OFFICE.

JOHN W. MEAKER, OF DETROIT, MICHIGAN.

CONDIMENT-HOLDER.

No. 913,029.	Specification of Letters Patent.	Patented Feb. 23, 1909.

Application filed May 22, 1908. Serial No. 434,246.

*To all whom it may concern:*

Be it known that I, JOHN W. MEAKER, a citizen of the United States of America, residing at Detroit, in the county of Wayne and State of Michigan, have invented certain new and useful Improvements in Condiment-Holders, of which the following is a specification, reference being had therein to the accompanying drawings.

This invention relates to condiment holders and more especially to shakers or sifters for table use, for salt, pepper and other powdered or pulverized substances.

One object of the invention is to provide a condiment holder or shaker which may be made by agitation and without inversion to evenly sift out its contents in small quantities and which, when standing in its normal position, is practically sealed to the outer air without the use of any closure for its discharge openings.

A further feature is to avoid lodgment of particles of the ejected contents on the exterior of the holder so that there is none shaken off and left on the table when the shaker is moved.

Another object of the invention is its arrangement so that when taken apart for charging, the condiment receptacle is readily filled through its base only to sufficient depth to operate properly when reverted to position for discharging, provision likewise being made whereby in the act of reassembling the parts after the receptacle is loaded they readily penetrate and push their way into the contents, the latter not becoming caked or packed so as to impede or prevent the proper engagement of the parts as might otherwise readily occur with salt, powdered sugar or the like.

To obtain these advantages, the invention, generally described, has an outer imperforate casing with permanently closed top and an open neck or filling mouth at its lower end, which is sealed by a base detachably secured thereto in such manner that the act of locking it in place draws it axially toward the casing top with a rotary movement. A discharge tube with its lower open end secured in an aperture in the base has a contracted upper tip with a series of sifting perforations near its extremity, and is of sufficient length to extend close to the casing top when the base is in place. The exterior of the tip is designed to work its way into and break up and disintegrate caked condiment placed in the inverted casing, when it is pushed into it by the rotary or screwlike movement imparted by the base when the latter is being locked in place, and the casing has a gage or filling mark showing to what point it may be filled so that when the tube is inserted and displaces and crowds the contents toward the base, there is left space so that the condiment may be properly agitated and ejected through the perforations by shaking the holder in the usual manner, but without inverting it.

Figure 2:
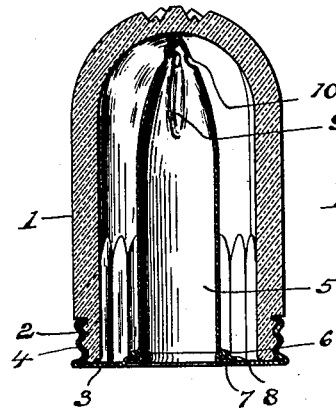
Figure 3:
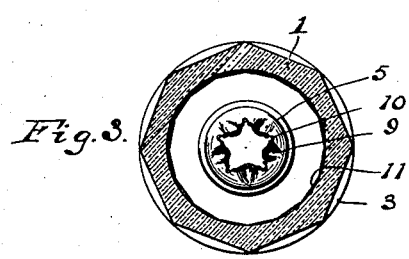
Figure 4:
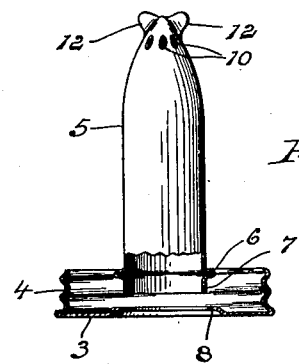
Figure 6:
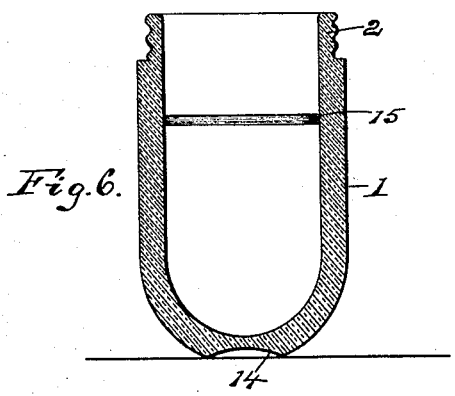
Figure 5:
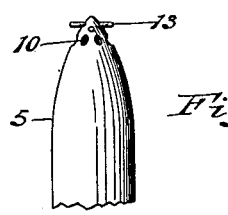

Referring to the drawings, Figure 1 is a view in elevation of a holder embodying features of the invention. Fig. 2 is a view in longitudinal section therethrough. Fig. 3 is a view in transverse section on or about line *x—x* of Fig. 1. Fig. 4 is a view in detail of a base and discharge tube in position for assembling, the tube having a modified form of tip. Fig. 5 is a view in detail of another form of. tube tip. Fig. 6 is a view in detail in section of a casing adapted to stand in inverted filling position.

As shown in the drawings, as an example of the device, a casing 1 of glass or other suitable material and appropriate outer design, is closed at its upper end and has a circular filling mouth at its lower end whose rim 2 is screw-threaded. A base 3 preferably of sheet metal or the like, has an annular flange 4 adapted to engage the casing rim. A tube 5 of sheet metal or the like is secured in a central aperture in the base. In its preferred form a peripheral rib 6 is formed near the end of the tube to form a shoulder on which the tube is seated when inserted in the base aperture, the margin 7 being rolled over the base forming a lock joint, the central portion 8 of the base being inset to give clearance for the seam when the base is resting on a smooth surface. The upper closed end of the tube is conical, and has longitudinally disposed flutes 9 on its exterior. A series of sifting perforations 10 are formed at an interval below the tip. The casing has a gage mark 11 which in Figs. 1 and 2 is the defining line between a decorative band on the casing and the general body of the casing. This mark shows a limit for filling the casing and leaving room after the tube is inserted so that the condiment may be thrown endwise in the casing and so that it will lie below the sifting perforations when the holder is upright. The tip flutes may be replaced by radial wings 12

(Fig. 4) or a transverse bar 13 (Fig. 5) and the casing may have a flat top 14 (Fig. 6) on which it may stand while being filled and a gage mark 15 may be specially cut thereon. By this construction, the operator readily fills the inverted casing to a proper depth, inserts the tube and base and in screwing it home breaks up and powders any cakes or lumps that have formed.

When the holder is reverted and rests on a table, it is practically air tight. The conical tip with its sifting perforations distributes the ejected condiment in evenly disseminated manner over quite a wide area, and no particles can lodge on the exterior to be afterwards shaken off on the table.

Obviously other forms of the device than those herein disclosed may be constructed without departing from the spirit of the invention, and I do not limit myself to any particular form or arrangement of parts.

What I claim as my invention is:—

1. A condiment holder comprising an outer imperforate casing closed at its upper end and open at its lower end, a discharge tube within the casing having a closed upper end provided with agitating means and sifting perforations therein and an open lower end, and means detachably securing the open end of the tube in the lower end of the casing adapted to force the tube axially toward the closed end of the casing when the parts are being interlocked.

2. A condiment holder comprising an outer imperforate casing having a single opening whereby it may be filled when inverted, a discharge tube having a closed inner end adapted to penetrate and displace the contents of the inverted casing when thrust into the casing in position for assembling, and an open outer end, and a base for the casing secured to the outer end of the tube adapted to detachably engage and seal the casing opening, the tube having sifting perforations and stirring means near its closed extremity adapted to disintegrate the contents in assembling.

3. A condiment holder comprising an outer imperforate casing having a single opening whereby it may be filled when inverted, a discharge tube having a closed inner end provided with sifting perforations and means adapted to penetrate, displace and stir the contents of the inverted casing when thrust into the casing in position for assembling, and an open lower end forming the discharge mouth of the casing, a base secured to the lower end of the tube adapted to close the casing mouth, and means for detachably securing the base to the casing adapted to force the tube longitudinally into the casing with a rotary motion when the parts are being brought into engagement.

4. A condiment holder comprising an outer imperforate casing having a single opening whereby it may be filled when inverted, a discharge tube having a conical closed inner end adapted to penetrate and displace the contents of the inverted casing when thrust into the casing in position for assembling, and an open outer end, and a base for the casing secured to the outer end of the tube adapted to detachably engage and seal the casing opening, the tube having sifting perforations near its closed extremity, and the casing having a filling gage mark on its wall.

5. A condiment holder comprising an outer imperforate casing having a single circular opening in its base whereby it may be filled when inverted, a discharge tube therein having a closed, conical upper end with sifting perforations near its tip, and with an exterior adapted to disintegrate and stir the contents of the inverted casing when thrust therein into position for assembling and an open lower end, a base secured to the lower end of the tube having screw-threaded engagement with the casing opening.

6. A condiment holder comprising an outer substantially cylindrical casing closed at its upper end, a discharge tube therein having a closed conical inner end with sifting perforations near its tip and projections on its surface adapted to disintegrate and stir the contents of the inverted casing when thrust therein into position for assembling and an open outer end, and a base secured to the outer end of the tube and detachably engaged by the lower end of the casing having screw-threaded engagement with the open end of the casing.

7. A condiment holder comprising an outer substantially cylindrical casing closed at its upper end and provided with a screw-threaded rim at its open lower end, a base having a central aperture and a flange adapted to detachably engage the rim, and a discharge tube having a closed conical inner end with sifting perforations near its tip and exterior projections adapted to stir the contents when thrust therein in assembling, and an open outer end secured in the base aperture.

8. A condiment holder comprising an outer substantially cylindrical casing closed at its upper end and provided with a screw-threaded rim at its open lower end, a base having a central aperture and a flange adapted to detachably engage the rim, and a discharge tube having a closed conical inner end with sifting perforations near its tip and exterior projections, and an open outer end secured in the base aperture, the casing having a filling mark whereby the level of the contents may be made to lie below the perforations when the holder is filled and standing on its base.

9. A condiment holder comprising an outer substantially cylindrical casing closed at its upper end and provided with a screw-threaded rim at its open lower end, a sheet metal base having a central aperture and a flange adapted to detachably engage the rim, and a sheet metal discharge tube having a closed conical inner end with sifting perforations near its tip and exterior projections, and an open outer end secured in the base aperture, the central portion of the base being inset around the aperture and the tube having a peripheral rib seated on the aperture margin of the base and a marginal flange reverted against the base and forming with the rib a lock seam.

10. A condiment holder comprising an outer substantially cylindrical casing closed at its upper end and provided with a screw-threaded rim at its open lower end, a base having a central aperture and a flange adapted to detachably engage the rim, and a discharge tube having a closed conical inner end with sifting perforations near its tip and agitating means on its periphery, and an open outer end secured in the base aperture.

In testimony whereof I affix my signature in presence of two witnesses.

JOHN W. MEAKER.

Witnesses:
C. R. STICKNEY,
A. M. DORR.